US011492049B2

(12) United States Patent
Rahman et al.

(10) Patent No.: US 11,492,049 B2
(45) Date of Patent: Nov. 8, 2022

(54) HINGE ASSEMBLY FOR A VEHICLE HOOD

(71) Applicant: Tesla, Inc., Palo Alto, CA (US)

(72) Inventors: Rafath Rahman, Milpitas, CA (US); Jarad Hutchinson, Sunnyvale, CA (US)

(73) Assignee: TESLA, INC., Austin, TX (US)

( * ) Notice: Subject to any disclaimer, the term of this patent is extended or adjusted under 35 U.S.C. 154(b) by 0 days.

(21) Appl. No.: 16/371,490

(22) Filed: Apr. 1, 2019

(65) Prior Publication Data

US 2019/0308666 A1 Oct. 10, 2019

Related U.S. Application Data

(60) Provisional application No. 62/652,658, filed on Apr. 4, 2018.

(51) Int. Cl.
| *B62D 25/12* | (2006.01) |
| *E05D 3/02* | (2006.01) |
| *E05D 11/00* | (2006.01) |
| *B60R 21/34* | (2011.01) |

(52) U.S. Cl.
CPC .............. *B62D 25/12* (2013.01); *B60R 21/34* (2013.01); *E05D 3/02* (2013.01); *E05D 11/00* (2013.01); *B60R 2021/343* (2013.01); *E05Y 2800/25* (2013.01); *E05Y 2900/536* (2013.01)

(58) Field of Classification Search
CPC ... B60R 21/34; B60R 2021/343; B62D 25/12; E05D 11/00; E05D 3/02; E05D 7/1077; E05D 2800/25; E05D 2900/536
See application file for complete search history.

(56) References Cited

U.S. PATENT DOCUMENTS 2,118,149 A * 5/1938 Booth .................... E05D 7/009
16/356
5,979,016 A * 11/1999 Fan ....................... E05D 7/1077
16/266

(Continued)

FOREIGN PATENT DOCUMENTS

DE 102013003302 B3 * 7/2014 ................ E05D 3/02
DE 102016222831 A1 * 5/2018 ................ E05D 7/12

(Continued)

OTHER PUBLICATIONS

"Sulfate and sulfate nickel plating," Sharrets Plating, http://www.sharrettsplating.com/coatings/nickel; retrieved Aug. 15, 2020; dated via the Internet Wayback Machine Jun. 7, 2017 (Year: 2017).*

(Continued)

*Primary Examiner* — Steve Clemmons
(74) *Attorney, Agent, or Firm* — Knobbe, Martens, Olson & Bear, LLP

(57) ABSTRACT

A hinge assembly for a hood of a vehicle is provided. The hinge assembly includes a body member and a hood member. The hood member is pivotally coupled with the body member through a pivot pin. The hood member or the body member partially wraps around the pivot pin such that the hood member or the body member defines a notch. The hood member or the body member is adapted to disengage from the pivot pin on application of an impact force on the hood member.

20 Claims, 7 Drawing Sheets

(56) References Cited

U.S. PATENT DOCUMENTS

| | | | | |
|---|---|---|---|---|
| 6,003,204 | A * | 12/1999 | Roach | E05D 7/1072 16/266 |
| 7,296,325 | B1 * | 11/2007 | Putumbaka | E05D 3/02 16/348 |
| 2002/0046444 | A1 * | 4/2002 | Kim | E05D 3/145 16/361 |
| 2009/0166116 | A1 * | 7/2009 | Kiya | B60L 3/0007 180/68.5 |
| 2012/0186044 | A1 * | 7/2012 | Radomski | B62D 25/12 16/382 |
| 2015/0336535 | A1 * | 11/2015 | Leavesley | B62D 25/12 296/187.09 |
| 2017/0350176 | A1 * | 12/2017 | Rahman | E05D 3/02 |
| 2017/0362868 | A1 * | 12/2017 | Veloso | E05D 7/1061 |

FOREIGN PATENT DOCUMENTS

| | | | | |
|---|---|---|---|---|
| EP | 2857266 A1 * | 4/2015 | | B60R 21/38 |
| WO | WO-0072101 A1 * | 11/2000 | | E05D 11/00 |

OTHER PUBLICATIONS

"Tin," Sharrets Plating, http://www.sharrettsplating.com/coatings/tin; retrieved Aug. 15, 2020; dated via the Internet Wayback Machine Jun. 6, 2017 (Year: 2017).*

"Zinc," Sharrets Plating, http://www.sharrettsplating.com/coatings/zinc; retrieved Aug. 15, 2020; dated via the Internet Wayback Machine Jun. 9, 2017 (Year: 2017).*

Hasegawa et al., "The electrodeposition of FeCrNi stainless stell microstructural changes induced by anode reactions," Phys. Chem. Chem. Phys. 2014, 16, 26375; Aug. 20, 2014 (Year: 2014).*

* cited by examiner

HINGE ASSEMBLY FOR A VEHICLE HOOD

CROSS REFERENCE TO RELATED PATENTS

The present U.S. Utility patent application claims priority pursuant to 35 U.S.C. § 119(e) to U.S. Provisional Application No. 62/652,658, entitled "HINGE ASSEMBLY FOR A VEHICLE HOOD", filed Apr. 4, 2018, which is hereby incorporated herein by reference in its entirety and made part of the present U.S. Utility Patent Application for all purposes.

TECHNICAL FIELD

The present disclosure relates to a hinge assembly for a hood of a vehicle, and in particular to a break-away design of hinge assembly for passive pedestrian protection from head impact.

BACKGROUND

Modern vehicles are mandated by safety standards to protect pedestrians from head-impact injuries, including a scenario in which a pedestrian would contact the vehicle's hood. To meet these requirements. Current state of the art safety systems are active systems that typically include a sensor system to detect a collision with pedestrian and fire (using a pyrotechnic) an actuator to lift the front hood into a protective position before pedestrian impact. However, such systems may be falsely triggered and can only be used once because the pyrotechnic is not reversible. The pyrotechnic is also expensive, adding to overall cost of vehicle. Therefore, there is a need for a safety system that overcomes the aforementioned drawbacks.

SUMMARY

This application discloses a hinge assembly for a hood of a vehicle. The hinge assembly includes a body member and a hood member. The hood member is pivotally coupled with the body member through a pivot pin. The hood member or the body member may partially wrap around pivot pin such that hood member or the body member defines a notch. The hood member or the body member is adapted to disengage from the pivot pin on application of an impact force on the hood member. Due to the application of the impact force on the hood member, a portion of the hood member or the body member deforms such that hood member or the body member disengages from pivot pin. The hinge assembly may further include a washer coupled to the pivot pin adjacent to the hood member. The body member defines a first opening to receive the pivot pin. The hood member defines a second opening to receive the pivot pin. A width of the second opening is smaller than a diameter of pivot pin.

In embodiments, the hinge assembly may be coupled to a hood assembly of the vehicle. The hood assembly includes a body member and a hood member. The hood member has a first end and a second end. The hinge assembly may pivotally couple the hood member to the body member towards the first end of the hood member. The hood member or the body member may partially wrap around the pivot pin such that the hood member or the body member defines a notch. The hood member or the body member disengages from the pivot pin on application of an impact force on the hood member. Due to the impact force on the hood member, a portion of the hood member or the body member deforms such that the hood member or the body member disengages from the pivot pin. Another hinge assembly may couple the hood member with the body member towards second end of the hood member. The hinge assembly may include a washer coupled to a pivot pin adjacent to hood member. The body member defines a first opening to receive the pivot pin. The hood member defines a second opening to receive the pivot pin. A width of the second opening is smaller than a diameter of pivot pin.

In embodiments, a vehicle may include a hood assembly that includes a hinge assembly of the present invention. The vehicle may include a body member and a hood member. The hood member may be coupled to body member such that the hood member covers internal components of the vehicle. The hood member extends between a first end and a second end. The hinge assembly may pivotally couple the hood member to the body member toward first end of the hood member. The hood member or the body member may partially wrap around the pivot pin such that the hood member or the body member defines a notch. The hood member or the body member is adapted to disengage from pivot pin on application of an impact force on the hood member. Due to application of the impact force on the hood member, a portion of the hood member or the body member deforms such that the hood member or the body member disengages from the pivot pin. Another hinge assembly may couple to the hood member with the body member towards second end of the hood member. The hinge assembly may further include a washer coupled to the pivot pin adjacent to the hood member. The body member defines a first opening to receive the pivot pin. The hood member defines a second opening to receive the pivot pin. A width of second opening is smaller than a diameter of the pivot pin.

Figure 1:
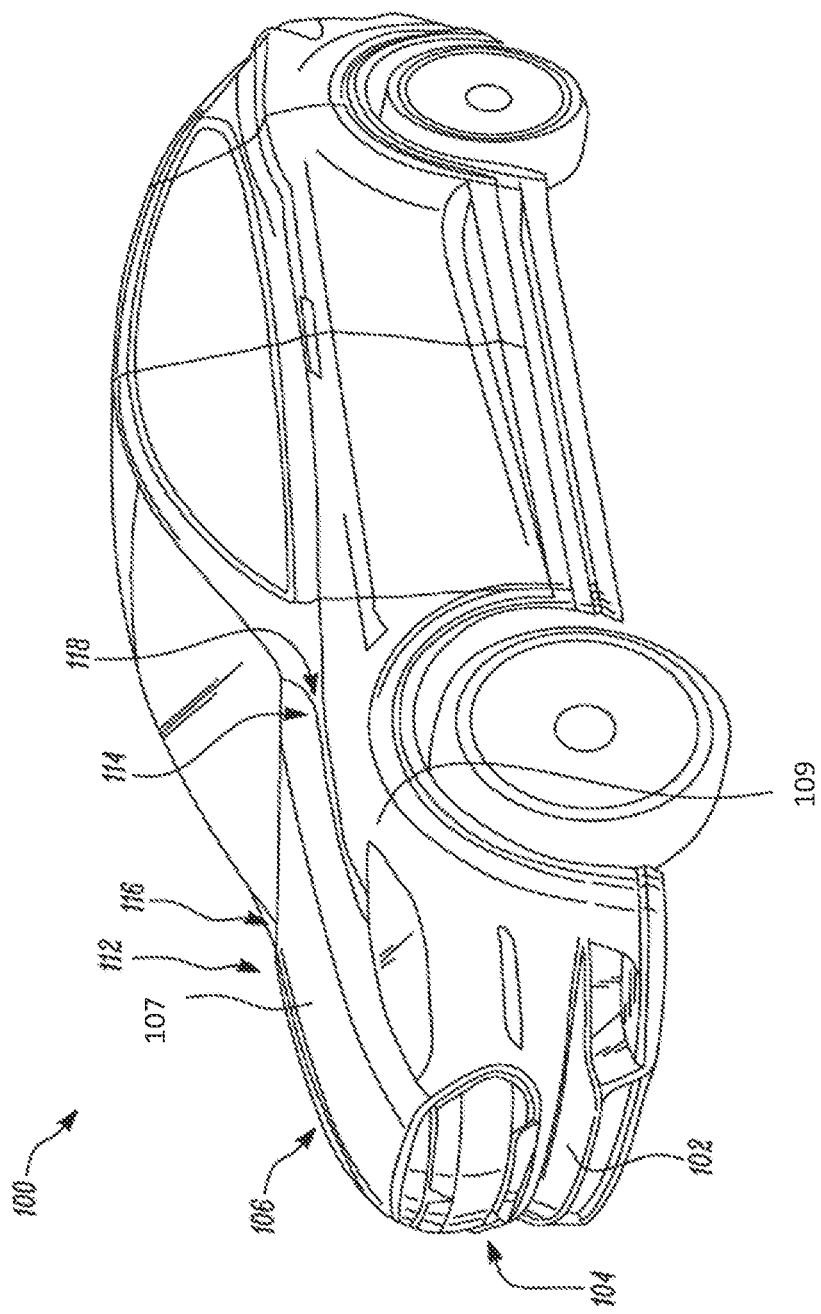
FIG. 1 illustrates an exemplary vehicle, according to certain embodiments of the invention.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting it.

DETAILED DESCRIPTION

FIG. 1 illustrates a vehicle 100 according to the present invention. Vehicle 100 includes a bumper 102 on a front end 104 of vehicle 100. Vehicle 100 includes a hood assembly 106 towards front end 104 of vehicle 100. Hood assembly 106 covers internal components (not shown) of vehicle 100 housed inside a cavity below hood assembly 106. Internal components may include drive system components, such as an electric motor, an engine or any other power source for vehicle etc. Alternatively, hood assembly 106 may be adapted to cover a front trunk, also known as a frunk, (not shown) provided on front side of vehicle 100.

Hood assembly 106 has a hood portion 107 and a body portion 109. Hood portion 107 is a flap-like component which covers the internal components of vehicle 100. Hood portion 107 extends between a first end 112 of hood portion 107 and a second end 114 of hood portion 107. Hood portion 107 is pivotally coupled to vehicle 100 through body portion 109 at first end 112 and second end 114. A hinge assembly 116 couples hood portion 107 to body portion 109 at first end 112. Another hinge assembly 118 couples hood portion 107 to body portion 109 at second end 114. Hinge assembly 116 and another hinge assembly 118 are similar to each other in structural and functional aspects. In embodiments, hinge assembly 116 and hinge assembly 118 are mirror images of one another. In embodiments, hinge assembly 116 and hinge assembly 118 are the same as each other.

Figure 2:
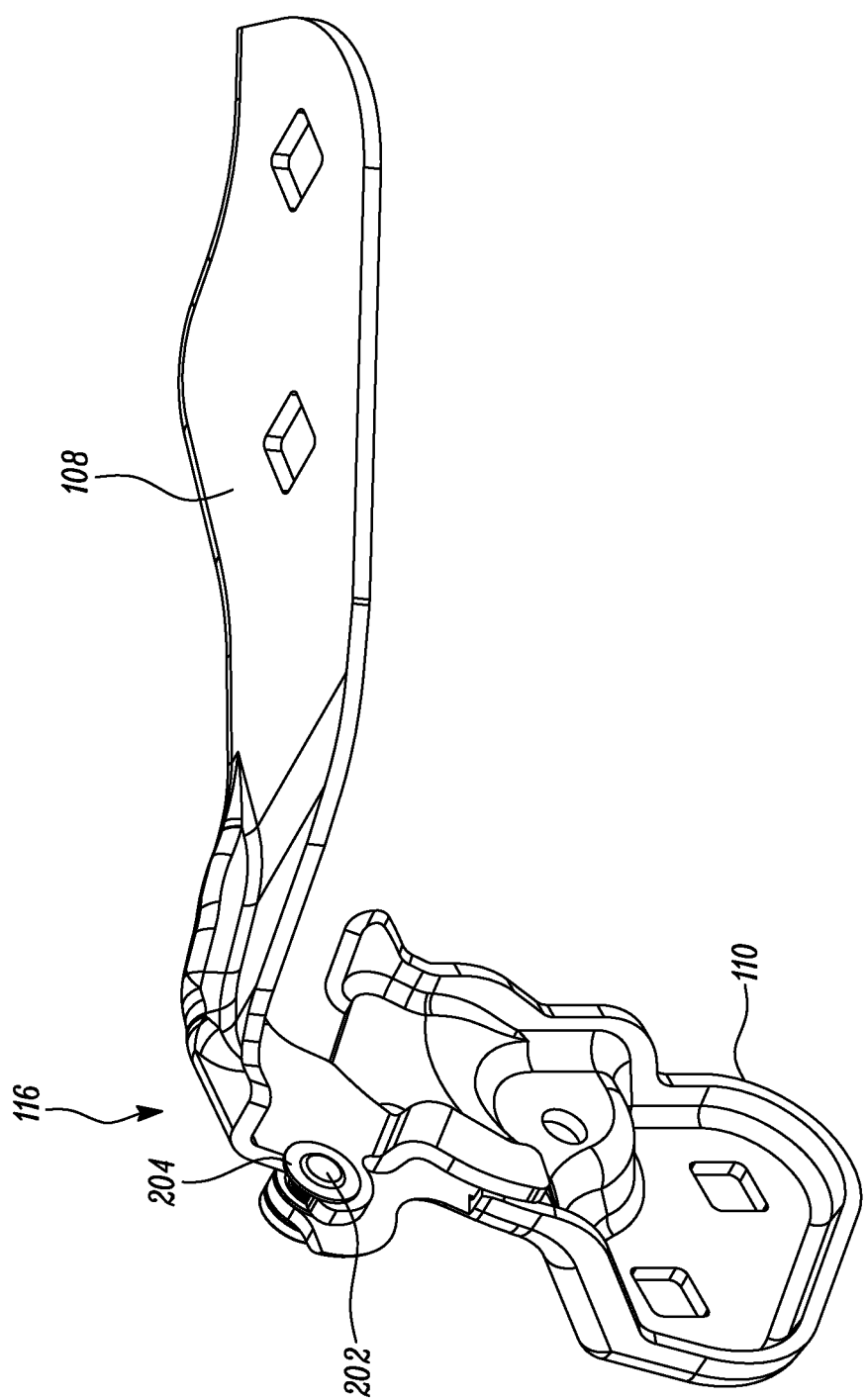
FIG. 2 illustrates a perspective view of a hinge assembly for a hood of the vehicle, according to certain embodiments of the invention.

FIG. 2 illustrates structural details of hinge assembly 116. Hinge assembly 116 includes hood member 108 and body member 110 pivotally coupled to each other through pivot pin 202. A washer 204 is coupled to pivot pin 202 adjacent to hood member 108. Washer 204 provides another support surface for pivot pin 202. The size of washer 204 may be suitably adjusted to ensure efficient connection between different components of hinge assembly 116.

In embodiments, components of hinge assembly 116 are made from steel or another metal. In embodiments, washer 204 is steel. In other embodiments, washer 204 is another metal. In embodiments, hinge assembly 116 is steel. In other embodiments, hinge assembly 116 is another metal. In embodiments, hood member 108 is steel. In other embodiments, hood member is another metal. In embodiments, body member 110 is steel. In other embodiments, body member 110 is another metal. In embodiments, components of hinge assembly 116 are electrocoated. In embodiments, washer 204 is electrocoated. In embodiments, hinge assembly 116 is electrocoated. In embodiments, hood member 108 is electrocoated. In embodiments, body member 110 is electrocoated.

Figure 3:
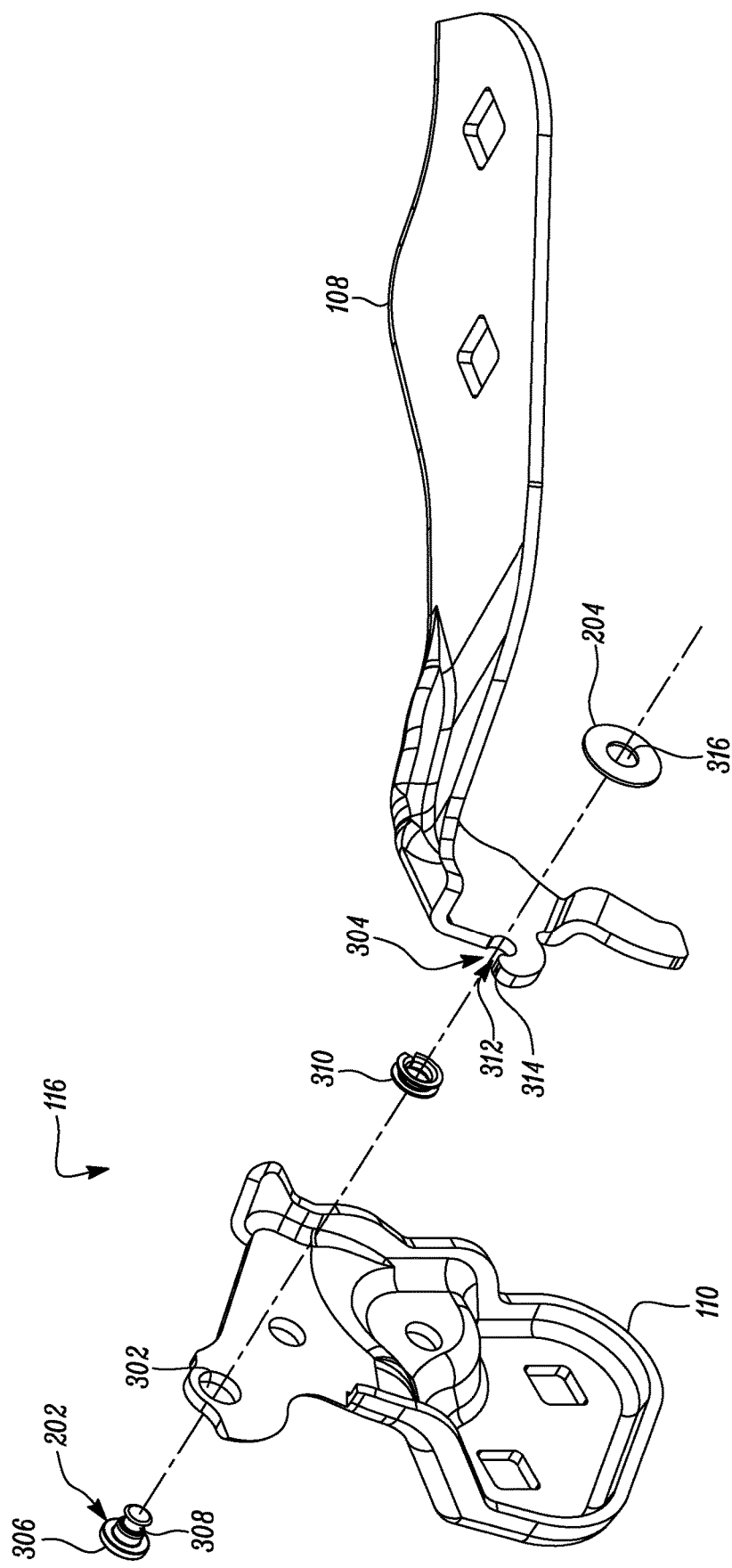
FIG. 3 shows an exploded view of the hinge assembly, according to certain embodiments of the invention.

Hinge assembly 116 is shown in an exploded view in FIG. 3. Body member 110 defines a first opening 302 to allow pivot pin 202 to pass through body member 110. The shape of first opening 302 may be such that pivot pin 202 conveniently passes through first opening 302. Further, hood member 108 defines a second opening 304 to allow pivot pin 202 to pass through hood member 108. Shape of second opening 304 may be such that pivot pin 202 conveniently passes through second opening 304. Pivot pin 202 has a generally cylindrical profile with a head portion 306 on one end. The cylindrical portion of pivot pin 202 defines a groove 308 over the pivot pin 202. A bushing 310 is coupled to body member 110 that allows pivot pin 202 to rotate. Bushing 310 has a generally round structure. Bushing 310 forms around body member 110, thereby allowing pivot pin 202 to rotate on the bushing 310. In embodiments, the hood member 108 is directly coupled to the pivot pin 202 via a washer.

In an assembled configuration of hinge assembly 116, hood member 108 defines a notch 312. Shape of notch 312 may be defined in a manner such that hood member 108 partially wraps around pivot pin 202. A portion 314 of hood member 108 adjacent to notch 312 is designed such that this portion 314 get deformed on application of an impact force on hood member 108. When hood member 108 gets deformed, hood member 108 disengages from pivot pin 202. Hood member 108 also disengages from body member 110. Hinge assembly 116 further includes washer 204. Washer 204 defines a third opening 316 to allow pivot pin 202 to pass through washer 204. Washer 204 is provided adjacent to hood member 108, and ensures compactness of hinge assembly 116 preventing any looseness or play between various components.

Hinge assembly 116 may be assembled by riveting pivot pin 202 along with washer 204 though body member 110 and hood member 108. Hood member 108 may operatively rotate about pivot pin 202 for accessing internal components of vehicle 100 as per requirement. Hood member 108 may include a protrusion that functionally restricts pivotal movement of hood member 108 about pivot pin 202 to a certain extent relative to body member 110. Both body member 110 and hood member 108 may comprise of a metal material, such as, for example, aluminum, or an alloy of steel.

In embodiments, hood member 108 may have the functionality of the body member and vice versa. That is, in embodiments, hood member 108 has a closed first opening 302 through which pivot pin 202 couples. Body member 110 then has a second opening 304 to allow pivot pin 202 to pass through body member 110 and then defines a notch 312. The shape of notch 312 allows for the notch to partially wrap around pivot pin 202. The body member 110 includes a portion 314 that is deformed on application of an impact force on hood member 108.

Figure 4:
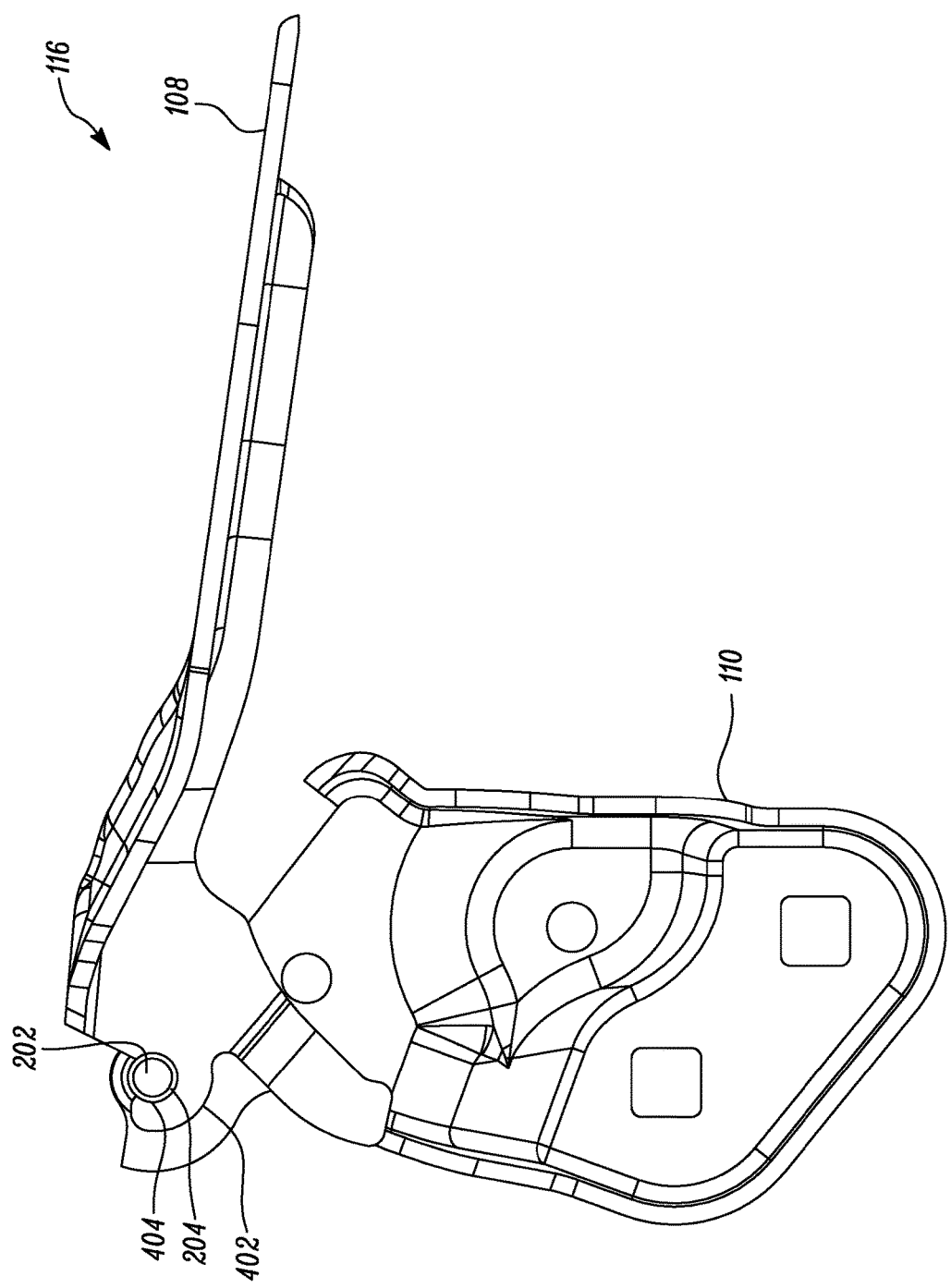
FIG. 4 shows a side view of the hinge assembly, according to certain embodiments of the invention.

FIG. 4 shows further structural details of hinge assembly 116. Hood member 108 includes an outer peripheral surface 402 and an inner peripheral surface 404 defined on hood member 108 such that inner peripheral surface 404 contacts pivot pin 202 of hinge assembly 116. Notch 312 can be defined on hood member 108 such that dimensions of notch 312 increases from inner peripheral surface 404 to outer peripheral surface 402. Although, notch 312 is illustrated as having a V-shape, it should be understood that the present disclosure is not limited by the shape of notch 312 in any manner.

Figure 5:
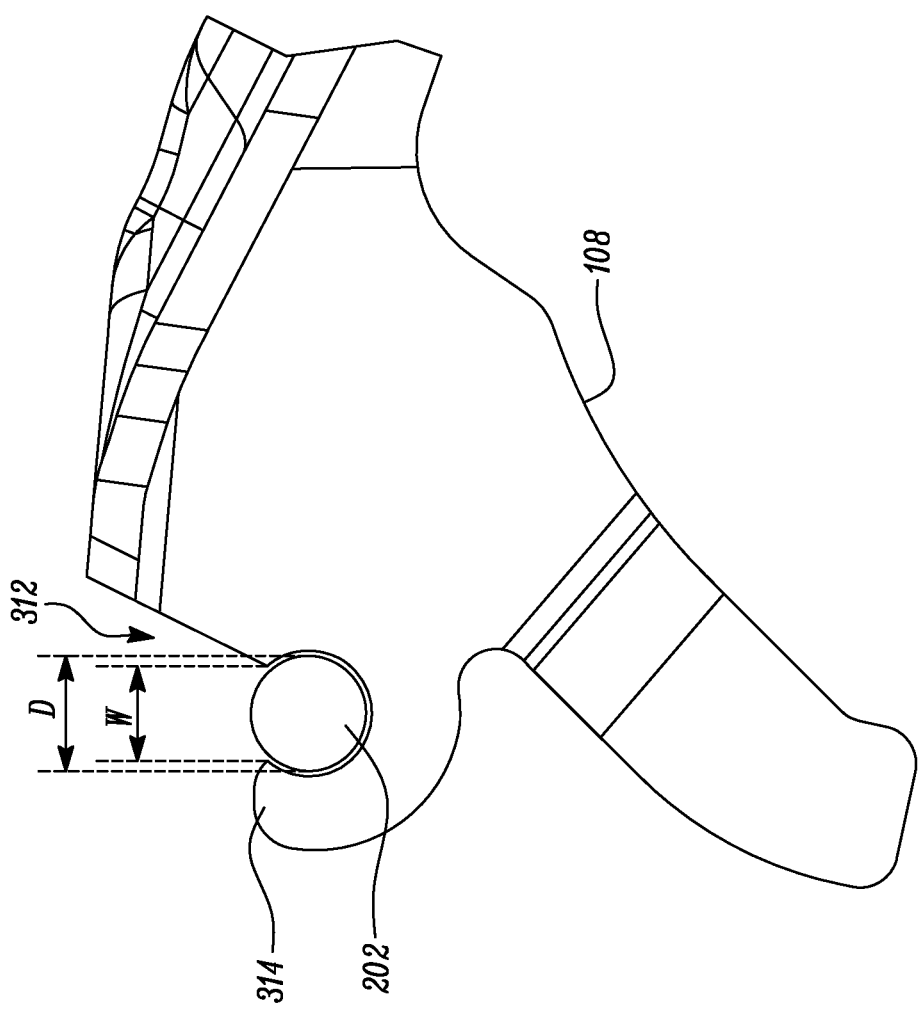
FIG. 5 shows an enlarged side view of the hinge assembly, according to certain embodiments of the invention.

FIG. 5 illustrates a diameter D of pivot pin 202, and a width W of notch 312. Diameter D of pivot pin 202 is greater than width W of notch 312 such that pivot pin 202 can be retained within notch 312 in normal functional state of hinge assembly 116. When impact force is applied to hood member 108, portion 314 of hood member 108 deforms, and width W of notch 312 is increased. Increased width W being greater than diameter D of pivot pin 202 allows hood member 108 to disengage with pivot pin 202, and hence, allows hinge assembly 116 to perform its intended function in instance of a crash or collision etc. In embodiments, the ratio of W to D is between 0.85-0.92, which was experimentally shown to be effective and achieve the desired safety standard when the hinge assembly 116 is made of steel. In other embodiments, the ratio of W to D is between 0.80-0.85.

Hood member 108, body member 110, pivot pin 202 and washer 204 together form hinge assembly 116. Friction is largely responsible for holding certain components together. Different materials and coatings can provide different coefficients of friction. In embodiments, components of hinge assembly 116 are made from steel or another metal. In embodiments, washer 204 is steel. In other embodiments, washer 204 is another metal. In embodiments, hinge assembly 116 is steel. In other embodiments, hinge assembly 116 is another metal. In embodiments, hood member 108 is steel. In other embodiments, hood member is another metal. In embodiments, body member 110 is steel. In other embodiments, body member 110 is another metal. In embodiments, components of hinge assembly 116 are electrocoated. In embodiments, washer 204 is electrocoated. In embodiments, hinge assembly 116 is electrocoated. In embodiments, hood member 108 is electrocoated. In embodiments, body member 110 is electrocoated. In embodiments, components of hinge assembly 116 are electrocoated. In embodiments, washer 204 is mechanically plated. In embodiments, hinge assembly 116 is mechanically plated. In embodiments, hood member 108 is mechanically plated. In embodiments, body member 110 is mechanically plated. It should be contemplated that electroplating, or mechanically plating are only exemplary methods, and the present disclosure is not limited by type of plating process being used in any manner.

The coefficient of friction is an important design parameter to determine the impact force necessary to disengage the body member 110 from the hood member 108. For example, coefficient of surface friction may be taken as 0.2 based on steel grade used for hinge assembly 116. In embodiments, body member 110, hood member 108 and pivot pin 202 may comprise a steel grade that is different from a steel grade of washer 204. This may help in keeping hinge assembly 116 together with notch 312 defined on hood member 108, at least for normal functional state of vehicle 100. Additionally, body member 110, hood member 108, pivot pin 202 and washer 204 may comprise of same materials, or different combination of material. Other materials may also be utilized, such as, for example aluminum, etc. One or more of body member 110, hood member 108, pivot pin 202 and washer 204 may be metal plated. In some embodiments, hood member 108 is metal plated around a portion of the hood member 108 adjacent to the notch 312. Similarly, body member 110 may be metal plated around a portion of the body member 110 adjacent to the notch 312. Metal plating may be done to achieve a desired coefficient of friction between two parts of hinge assembly 116 and also to impart corrosion resistance. The coefficient of friction between the hinge members affects the slip force required to disengage body member 110, or hood member 110 from pivot pin 202. Metal plating may be done by electroplating, mechanically plating, or another plating technique. The metal plating may plate steel, zinc, nickel, tin, or another metal that has the desired friction properties and corrosive properties. It should be understood that the present disclosure is not limited by choice of material composition of various components of hinge assembly 116 in any manner.

Figure 6:
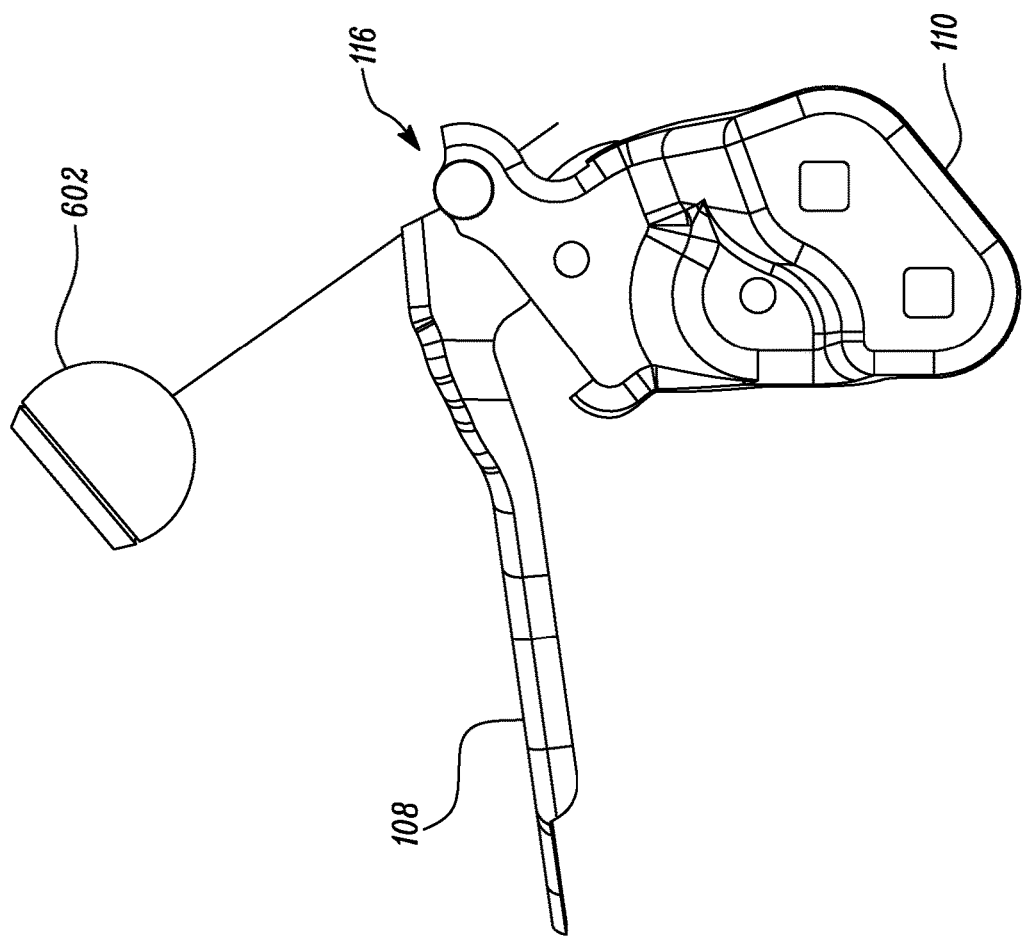
FIG. 6 schematically shows the hinge assembly being impacted by a pedestrian head, according to certain embodiments of the invention.

FIG. 6 illustrates impact of a headform 602 on hinge assembly 116. Headform 602 represents the head (or portion thereof) of a pedestrian or other living being. As illustrated, when a collision occurs such that headform 602 hits a portion of hood member 108 of vehicle 100, a force is generated. When the force is great enough, the impact force causes hood member 108 to disengage from hinge assembly 116. The impact force typically causes deformation of portion 314 of hood member 108 adjacent to notch 312 such that pivot pin 202 disengages with second opening 304 of hood member 108. In embodiments, the width W of notch 312 is altered to change the impact force at which the hood member 108 disengages from hood member 108. In embodiments the impact force causes deformation of the pivot pin 202 to allow disengagement of hood member 108 from body member 110.

Only the impact force generated on hinge assembly 116 provides sufficient force to disengage the hinge assembly 116. Routine operation of the vehicle and forces less than the impact force are insufficient to disengage hinge assembly 116. For example, if a front-end collision occurs between pedestrian and vehicle 100 and the force is less than the impact force, the hood member will not disengage from the body member 110.

In an event of collision, hood member 108 may disengage with hinge assembly 116 such that safety standards can be met. Hood member 108 may move down due to impact force and disengagement with hinge assembly 116. To allow movement of hood member 108, sufficient space may be provided by trimming away portions of hood member 108 and body member 110. Advantageously, this would lower weight of components while maintaining the safety standards for vehicle 100.

Hinge assembly 116 may be incorporated as a part of pedestrian protection system that operates passively. Such a system would not need any additional components, such as sensors, controllers, as in case of an active pedestrian protection system. The present invention would enable a pedestrian protection system to be inherently safer and less prone to false triggers.

Figure 7:
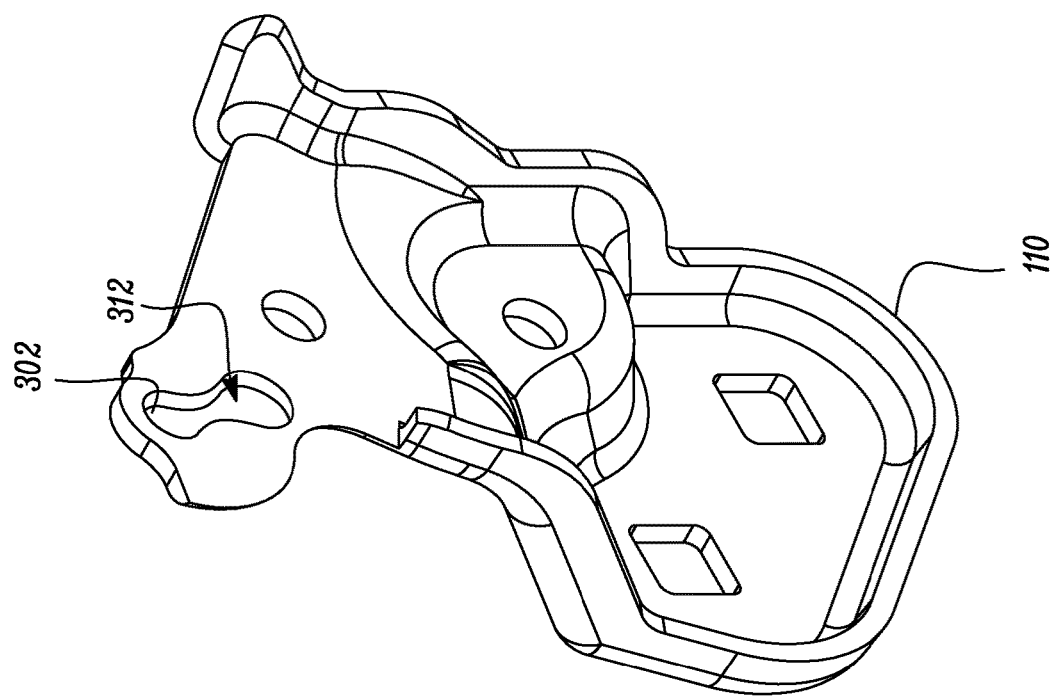
FIG. 7 shows an exploded view of the hinge assembly, according to certain embodiments of the invention.

FIG. 7 illustrates another embodiment of the present disclosure. A perspective view of body member 110 is shown. The notch 312 is defined within body member instead of the hood member 108 as another variation to the design of the hinge assembly 116. Notch 312 is defined such that body member 110 partially wraps around pivot pin 202. In event of a collision, or an impact force applied to hood member 108, portion of body member 310 adjacent to notch 312 gets partially deformed. Partial deformation allows pivot pin 202 to slip inside notch 312, and body member 110 disengages hood member 108. Disengagement of body member 110 and hood member 108 meets necessary safety requirements as previously described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed hinge assembly. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

What is claimed is:

1. A hinge assembly for a hood of a vehicle, the hinge assembly comprising:
    a body member comprising a first opening;
    a hood member comprising a second opening;
    an independent pivot pin comprising a cylindrical profile;
    wherein the pivot pin passes through the first opening and the second opening;
    wherein the body member pivotally couples with the hood member via the pivot pin;
    wherein the second opening partially wraps around the pivot pin to define a notch having an opening, the opening of the notch opening toward the hood member when the hinge assembly is in a closed position; and
    wherein upon an application of an impact force on the hood member, the hood member disengages from the pivotal coupling and result in a disengagement from the body member, wherein a path of disengagement between the hood member and the body member is defined by the notch opening.

2. The hinge assembly of claim 1, wherein the notch of the hood member is adapted to deform from the pivot pin on application of the impact force on the hood member.

3. The hinge assembly of claim 2, wherein the pivot pin has a diameter and the notch has a width such that a ratio of the width of the notch to the diameter of the pivot pin is between 0.85-0.92.

4. The hinge assembly of claim 1, wherein the hinge assembly further is composed of steel.

5. The hinge assembly of claim 1, wherein the disengagement from the pivot pin corresponds to a disengagement from the body member.

6. A hood assembly for a vehicle, the hood assembly comprising:
    a body portion comprising a body member, the body member having a first opening;
    a hood portion comprising a hood member and having a first end and a second end, the hood member having a second opening; and
    a hinge assembly pivotally coupling the hood member with the body member toward the first end of the hood portion;
    an independent pivot pin comprising a cylindrical profile;
    wherein the pivot pin passes through the first opening and the second opening;
    wherein the second opening partially wraps around a pivot pin such that the hood member defines a notch, the notch including an opening facing the hood member when the hinge assembly is in a closed position; and
    wherein upon an application of an impact force on the hood member, the hood member decouples from the body member disengaging from the pivot pin along an axis defined by the opening facing the hood member.

7. The hood assembly of claim 6, wherein a portion of the hood member is adapted to deform on application of the impact force on the hood member.

8. The hood assembly of claim 7, wherein the pivot pin has a diameter and the notch has a width such that a ratio of the width of the notch to the diameter of the pivot pin is between 0.85-0.92.

9. The hood assembly of claim 6, wherein the hinge assembly is composed of steel.

10. The hood assembly of claim 6, wherein the disengagement from the pivot pin corresponds to a disengagement from the body member.

11. A vehicle comprising:
    a body portion comprising a body member, the body member having a first opening;
    a hood portion comprising a hood member and coupled to the body member such that the hood portion covers internal components of the vehicle, wherein the hood portion extends between a first end and a second end;
    a hinge assembly adapted to pivotally couple the hood member with the body member towards the first end of the hood portion,
    an independent pivot pin comprising a cylindrical profile;
    wherein the pivot pin passes through the first opening and the second opening;
    wherein the second opening partially wraps around a pivot pin such that the hood member defines a notch, the notch further defining an opening facing the hood member when the hinge assembly is in a defined position; and
    wherein the hood member disengages from the pivotal coupling and result in a disengagement from the pivot pin on application of an impact force on the hood member the disengagement defined by the defined opening in the notch.

12. The vehicle of claim 11, wherein a portion of the hood member is adapted to deform on application of the impact force on the hood member.

13. The vehicle of claim 11, wherein the pivot pin has a diameter and the notch has a width such that a ratio of the width of the notch to the diameter of the pivot pin is between 0.85-0.92.

14. The vehicle of claim 11, wherein the pivot pin, the hood member, and the body member are composed of steel.

15. The vehicle of claim 11, wherein one or more of the hood member, the body member and the pivot pin are metal plated.

16. The vehicle of claim 15, wherein the metal plating is tin plating.

17. The vehicle of claim 15, wherein the metal plating is zinc plating.

18. The vehicle of claim 15, wherein the metal plating is steel plating.

19. The vehicle of claim 15, wherein the metal plating is nickel plating.

20. The vehicle of claim 11, wherein the disengagement from the pivot pin corresponds to a disengagement from the body member.

\* \* \* \* \*